US009668495B2

(12) United States Patent
Sasame et al.

(10) Patent No.: US 9,668,495 B2
(45) Date of Patent: Jun. 6, 2017

(54) GREEN TEA BEVERAGE WITH SUGAR ALCOHOLS AND CATECHINS AND PROCESS PACKED IN CONTAINER

(75) Inventors: Masami Sasame, Shizuoka (JP);
Keisuke Numata, Shizuoka (JP);
Fuyuki Fujihara, Shizuoka (JP);
Kazunobu Tsuru, Shizuoka (JP)

(73) Assignee: ITO EN, LTD., Tokyo (JP)

( * ) Notice: Subject to any disclaimer, the term of this patent is extended or adjusted under 35 U.S.C. 154(b) by 711 days.

(21) Appl. No.: 13/203,465

(22) PCT Filed: Feb. 25, 2010

(86) PCT No.: PCT/JP2010/052979
§ 371 (c)(1),
(2), (4) Date: Nov. 3, 2011

(87) PCT Pub. No.: WO2010/098390
PCT Pub. Date: Sep. 2, 2010

(65) Prior Publication Data
US 2012/0058242 A1 Mar. 8, 2012

(30) Foreign Application Priority Data
Feb. 27, 2009 (JP) ................................. 2009-047419

(51) Int. Cl.
*A23F 3/16* (2006.01)
(52) U.S. Cl.
CPC .................... *A23F 3/163* (2013.01)
(58) Field of Classification Search
None
See application file for complete search history.

(56) References Cited

U.S. PATENT DOCUMENTS

| 5,879,733 | A  * | 3/1999  | Ekanayake et al. | 426/271 |
| 6,268,009 | B1 * | 7/2001  | Ekanayake et al. | 426/597 |
| 6,299,925 | B1 * | 10/2001 | Xiong et al. | 426/597 |
| 6,413,558 | B1 * | 7/2002  | Weber et al. | 426/2 |
| 7,087,259 | B2 * | 8/2006  | Wild et al. | 426/597 |
| 2009/0117252 | A1 * | 5/2009 | Satake et al. | 426/597 |
| 2009/0311383 | A1 | 12/2009 | Fukuda et al. | |

FOREIGN PATENT DOCUMENTS

| JP | 04-228028 | 8/1992 |
| JP | 06-303904 | 11/1994 |
| JP | 06-343389 | 12/1994 |
| JP | 08-066156 | 3/1996 |
| JP | 08-126472 | 5/1996 |
| JP | 11-056242 | 3/1999 |
| JP | 11-262359 | 9/1999 |
| JP | 2001-258477 | 9/2001 |
| JP | 2001-286260 | 10/2001 |
| JP | 3590051 B1 | 11/2004 |
| JP | 2005-130734 | 5/2005 |
| JP | 2007-117006 | 5/2007 |
| JP | 2008-072923 | 4/2008 |
| JP | 2008-136367 | 6/2008 |
| JP | 4136922 B2 | 8/2008 |
| TW | 200826849 A | 7/2008 |
| WO | WO 2007132562 A1 * | 11/2007 ............... A23F 3/16 |
| WO | WO-2008/081542 A1 | 7/2008 |

OTHER PUBLICATIONS

Ding, Y. et al., "Direct determination of free amino acids and sugars in green tea by anion-exchange chromatography with integrated pulsed amperometric detection", Journal of Chromatography A, 2002, vol. 982, pp. 237-244.
Hisanobu, Y., et al. "Quantitative Determination of Caffeine and Catechins in Tea Drinks", 1992, article 0008, pp. 69-77.
International Search Report in PCT/JP2010/052979 dated Apr. 13, 2010.
IPRP in PCT/JP2010/052979 dated Feb. 25, 2010.
Kawakami, M. et al., "Formation of Aroma Components in Roasted or Pan-fired Green Tea by Roasting or Pan-firing Treatment", Nippon Nogeikagaku Kaishi, 1999, vol. 73., No. 9, pp. 893-906.
Muramatsu, Keiichiro, Shokuhinno Kagaku, Series, Mar. 15, 1991, pp. 64, 65, 92-97.
Toyomasa, A., et al. "Changes in the Free Sugar Contents of Green Tea during Heating or Storage", Dec. 25, 1984, No. 66, pp. 47-51.
Toyomasa, A., et al. "High-Performance Liquid Chromatographic Determination of Free Sugars in Green Tea", Nippon Shokuhin Kogyo Gakkaishi, 1981, vol. 28, No. 12, pp. 632-639.
Written Reply in PCT/JP2010/052979 pp. 1-10.

* cited by examiner

*Primary Examiner* — Tamra L Dicus
(74) *Attorney, Agent, or Firm* — Foley & Lardner LLP

(57) ABSTRACT

Disclosed is a green tea beverage packed in a container which has a strong fire odor (savory odor), yet gives a refreshing aftertaste and can be drunk delectably even in a cold state. Specifically disclosed is a green tea beverage packed in a container characterized in that the saccharide concentration thereof, which is the sum of the monosaccharide concentration and the disaccharide concentration, is 100 to 300 ppm and the ratio of the disaccharide concentration to the monosaccharide concentration (disaccharides/monosaccharides) is 10 to 28. It is preferred that the ratio of catechins with electron localization to said saccharide concentration (catechins with electron localization/saccharides) is 1.0 to 2.5.

4 Claims, No Drawings

GREEN TEA BEVERAGE WITH SUGAR ALCOHOLS AND CATECHINS AND PROCESS PACKED IN CONTAINER

TECHNICAL FIELD

The present invention relates to a green tea beverage packed in a container that contains an extraction of green tea that is extracted from a green tea as a major component, which is filled into a plastic bottle or a can or the like.

BACKGROUND ART

With regard to the flavor of a green tea beverage, various inventions have been suggested from various viewpoints such as elevation of original odor and good taste of a green tea, or match to the taste of a consumer, and the like.

For example, Patent Document 1 discloses a method of manufacturing a water-soluble tea extract having flavor by adding enzymes to a tea extraction residue to hydrolyze it.

Patent Document 2 discloses a tea beverage that is obtained by two step extractions, i.e., extracting tea leaves in 80 to 100° C. hot water for 30 to 90 seconds, and then cooling the extract to 30 to 50° C. by adding cold water for 120 to 300 seconds, and then extracting it, wherein the tea beverage has high odor in the same degree as that of a high temperature-extracted tea beverage, and deep delicious taste and strong richness in the same degree as that of a low temperature-extracted tea beverage, and weak sourness.

Patent Document 3 discloses a low temperature extraction method of preventing generation of off flavor, which is so-called retort smell that occurs at the time of sterilization treatment.

Patent Document 4 discloses a method of mixing extraction liquids of refined green tea (Gyokuro tea) and deep-steamed tea for improving the flavor.

In addition, Patent Document 5 discloses a method of manufacturing a product that has a balance of delicious taste and aroma by using at least 2 or more kinds of extraction water of low temperature extraction and high temperature extraction.

Patent Document 6 suggests a method in which live tea leaves are roasted with an oven, whereby to boost the unique aroma of fired tea by heating and improve tea flavor.

Patent Document 7 suggests a method of manufacturing a green tea beverage packed in a tight-sealed container by blending an extraction of green tea, which is extracted by low temperature aqueous media such as 45 to 70° C. ion-exchanged water and the like from tea leaves (green tea), with an extract from live tea leaves extracted with hot water as it is, or a live tea leaf extract condensed and/or dried therefrom, which is intended to provide a green tea beverage packed in a tight-sealed container, which has freshly-brewed tea aroma and balanced flavor.

In addition, Patent Document 8 discloses a method of manufacturing a green tea beverage that is excellent in flavor, and has a good balance of aroma components, and has no unpleasant sediments, which comprises two-divided tea extraction steps, i.e., as one step, extraction of green tea leaves under pressure to obtain a pressure-extraction liquid (step A), and as another step, extraction of green tea leaves under ordinary pressure and fine filtration of this to obtain an ordinary pressure-extraction liquid (step B), and a mixing step of the pressure-extraction liquid and the ordinary pressure-extraction liquid obtained in each step in a mixing ratio that is determined on the basis of the weight of the raw tea leaves (step C).

Patent Document 9 discloses a method of manufacturing a green tea beverage that appropriately has unique green tea odor, delicious taste and richness, presents light greenish yellow of the color tone, and is translucent having no sediments even with long period storage, which comprises extracting a green tea with warm water at pH 8.0 to 10.0, and adjusting the extraction liquid to have pH 5.5 to 7.0 and 83 to 93% of turbidity as T % at 660 nm, respectively and then filling it into a package container and tight-sealing the package container.

In addition, Patent Document 10 discloses a method of manufacturing a tea beverage that is excellent in flavor, particularly excellent in nutritious taste, which comprises (i) a step of bringing tea leaves into contact with saturated steam, to promote opening of the tea leaves in the low temperature extraction step, (ii) a step of extracting the above-treated tea leaves with low temperature water, to obtain an extraction liquid, and (iii) a step of subjecting the above-mentioned extraction liquid to sterilization treatment.

Patent Documents 11 and 12 disclose a beverage packed in a container of which astringent taste and bitter taste are suppressed, which is obtained by blending a green tea extract containing high concentration of catechins with hydrocarbon in a suitable ratio.

PRIOR ART DOCUMENT

Patent Document

Patent Document 1: Japanese Patent Application Laid-Open (JP-A) No. H4-228028
Patent Document 2: JP-A No. H6-303904
Patent Document 3: JP-A No. H6-343389
Patent Document 4: JP-A No. H8-126472
Patent Document 5: JP-A No. H11-56242
Patent Document 6: JP-A No. H11-262359
Patent Document 7: JP-A No. 2001-258477
Patent Document 8: JP-A No. 2001-286260
Patent Document 9: JP-A No. 2005-130734
Patent Document 10: JP-A No. 2007-117006
Patent Document 11: Japanese Patent No. 3590051
Patent Document 12: Japanese Patent No. 4136922

DISCLOSURE OF THE INVENTION

Problems to be Solved by the Invention

Along with popularization of a green tea beverage, particularly a green tea beverage packed in a container, consumer taste and drinking situations have also become diversified, and a characteristic green tea beverage packed in a container that has unique taste and odor is demanded.

In order to freshen the aftertaste of a green tea beverage, the concentration of the soluble solid content may be lowered simply to prepare the green tea beverage. However, the taste becomes diluted then. Reversely, if the concentration of the soluble solid content is increased, the taste becomes heavy, and the fire odor (savory odor) becomes barely sensed.

To resolve such problems, the present invention provides a novel green tea beverage packed in a container, which has strong fire odor (savory odor) and has no light taste, and yet gives refreshing aftertaste, and can be drunk delectably even in a cold state.

Means for Solving the Problems

The green tea beverage packed in a container of the present invention is characterized in that the concentration of saccharides, which is the sum of the concentration of monosaccharides and the concentration of disaccharides, is 100 ppm to 300 ppm, and the ratio of the concentration of disaccharides relative to the concentration of monosaccharides (disaccharide/monosaccharide) is 10 to 28.

The green tea beverage packed in a container of the present invention makes it possible to obtain a novel green tea beverage packed in a container that has strong fire odor (savory odor), has no light taste, and yet has refreshing aftertaste, and can be drunk delectably even in a cold state, by adjusting the concentration of saccharides which is a sum of the concentration of monosaccharides and the concentration of disaccharides, and the concentration ratio of disaccharides to monosaccharides.

MODE FOR CARRYING OUT THE INVENTION

Hereinafter, one illustrative embodiment of the green tea beverage packed in a container of the present invention will be explained. However, the present invention is not limited to this illustrative embodiment.

The present green tea beverage packed in a container is a beverage obtained by filling a liquid containing an extraction liquid or an extract that is obtained by extraction of a green tea as a major component, into a container. The liquid includes, for example, a liquid that comprises only an extraction liquid that is obtained by extraction of a green tea, or a liquid obtained by dilution of the extraction liquid, or a liquid obtained by mixing of the tea extraction liquids with each other, or a liquid obtained by addition of an additive to any of the above-mentioned liquids, or a liquid obtained by dispersion of those dried of any of the above-mentioned liquids and the like.

The "major component" encompasses a meaning that containing of other components is acceptable within a range of not impeding the functions of the major component. At this time, the content ratio of the major component is not specified, but an extraction liquid or an extract that is obtained by extraction of a green tea, preferably takes up 50% or more by mass, particularly 70% or more by mass, and particularly 80% or more by mass (including 100%) in the solid content concentration in the beverage.

In addition, the kind of green tea is not particularly limited. For example, the kind of green tea includes broadly teas that are classified as a non-fermented tea such as a steamed tea, a decocted tea, a refined green tea, a green powdered tea, a Bancha tea, a bead green tea, an oven-roasted tea, a Chinese green tea and the like, and also encompasses a blend thereof in 2 or more kinds. In addition, cereals such as a brown rice, a flavor such as jasmine and the like may be also added thereto.

One illustrative embodiment of the green tea beverage packed in a container of the present invention (referred to as the "present green tea beverage packed in a container") is characterized in that the concentration of saccharides which is the sum of monosaccharides and disaccharides, is 100 ppm to 300 ppm, and the concentration ratio of disaccharides to monosaccharides (disaccharide/monosaccharide) is 10 to 28.

A monosaccharide is a hydrocarbon represented by a general formula $C_6(H_2O)_6$, and is not hydrolyzed any more to further simply saccharide. The monosaccharide referred to in the present invention represents glucose or fructose.

A disaccharide is a hydrocarbon represented by a general formula $C_{12}(H_2O)_{11}$, and is hydrolyzed to give a monosaccharide. The disaccharide referred to in the present invention represents sucrose, cellobiose or maltose.

When the concentration of saccharides which is the sum of monosaccharides and disaccharides (hereinafter, referred to as the concentration of saccharides), is 100 ppm to 300 ppm, it allows a beverage that has a balance of the taste and the odor being maintained, and has sweet taste and richness, and has small bitter astringent taste and coarse taste, etc. in the aftertaste even when the present green tea beverage is drunk after a long storage at normal temperature, or in a cold state.

From such viewpoint, the concentration of saccharides is preferably 120 ppm to 260 ppm, particularly preferably 140 ppm to 220 ppm.

In adjustment of the concentration of saccharides to the above-described range, dry (fire) process or extraction of the tea leaves may be adjusted to suitable conditions. For example, if the dry (fire) process of the tea leaves is performed strongly, the saccharides are decomposed and decrease. In addition, if the tea leaves are extracted at high temperature for a long time, the saccharides are decomposed and decrease. Therefore, the concentration of saccharides may be adjusted by adjusting the dry (fire) conditions and the extraction conditions of the tea leaves.

At this time, although the adjustment may be performed by addition of saccharides, this has a fear of collapsing the original flavor balance of a green tea beverage, so the adjustment is preferably not performed by addition of saccharides, but by adjusting conditions for obtaining a tea extraction liquid, and in addition, by mixing of the tea extraction liquids with each other, or by addition of a tea extract, or the like.

In addition, when the ratio of the concentration of disaccharides relative to the concentration of monosaccharides (disaccharide/monosaccharide) is 10 to 28, the odor note when the green tea beverage is put into the mouth and the fire odor through the nose are excellent, and the fire odor is present in drinking, which allows delicious drinking even when the beverage is drunk in a cold state.

From such viewpoint, the ratio of the concentration of disaccharides relative to the concentration of monosaccharides (disaccharide/monosaccharide) is preferably 11 to 25, particularly preferably 15 to 22.

In adjustment of the ratio of the concentration of disaccharides relative to the concentration of monosaccharides to the above-described range, the adjustment may be performed by suitably adjusting the conditions for the dry (fire) process or extraction of the tea leaves. For example, when the dry (fire) process of the tea leaves is performed, monosaccharides decrease first, and then disaccharides decrease, and thus the ratio of the disaccharides/monosaccharides can be elevated by strongly performing the dry (fire) process of the tea leaves, and extracting the tea leaves at high temperature for a short time.

At this time, although the adjustment may be performed by addition of saccharides, this has a fear of collapsing the balance of a green tea beverage, so the adjustment is preferably performed by adjusting conditions for obtaining a tea extraction liquid, and in addition, by mixing of the tea extraction liquids with each other, or by addition of a tea extract, or the like.

The concentration of total catechins in the present green tea beverage packed in a container is preferably 150 ppm to 600 ppm.

The concentration of the total catechins is particularly more preferably 200 ppm to 500 ppm, and further preferably 250 ppm to 400 ppm.

If the concentration of catechins is too high, the odor becomes obscure, and thus when the odor particularly has importance, the concentration of the total catechins is preferably 380 ppm or less, particularly preferably 350 ppm or less.

At this time, the total catechins mean total 8 kinds of catechin (C), gallocatechin (GC), catechin gallate (Cg), gallocatechin gallate (GCg), epicatechin (EC), epigallocatechin (EGC), epicatechin gallate (ECg) and epigallocatechin gallate (EGCg), and the concentration of the total catechins means total values of the concentrations of the 8 kind catechins.

In adjustment of the concentration of the total catechins to the above-described range, the concentration of the total catechins may be adjusted by adjusting extraction conditions.

At this time, although the adjustment may be performed by addition of catechins, this has a fear of collapsing the balance of a green tea beverage, so the adjustment is preferably performed by adjusting conditions for obtaining a tea extraction liquid, and in addition, by mixing of the tea extraction liquids with each other, or by addition of a tea extract, or the like.

The concentration of the electron-localized catechins in the present green tea beverage packed in a container is preferably 120 ppm to 500 ppm.

The concentration of the electron-localized catechins is particularly more preferably 160 ppm to 420 ppm, and particularly further preferably 205 ppm to 350 ppm.

The "electron-localized catechin" referred to in the present invention is a catechin that has a triol structure (a structure having 3 OH groups adjacent to the benzene ring), and is considered to be likely to have localization of the electric charge when ionized. Specifically, the "electron-localized catechin" includes epigallocatechin gallate (EGCg), epigallocatechin (EGC), epicatechin gallate (ECg), gallocatechin gallate (GCg), gallocatechin (GC), catechin gallate (Cg) and the like.

In adjustment of the concentration of the electron-localized catechins to the above-described range, the concentration of the electron-localized catechins may be adjusted with the extraction conditions. However, the concentration of the electron-localized catechin easily changes with the extraction time and the temperature, and thus if the temperature is too high, or the extraction time is too long, it is not preferable also in view of holding the aroma of the beverage. At this time, although the adjustment may be performed by addition of the electron-localized catechin, this has a fear of collapsing the balance of a green tea beverage, so the adjustment is preferably performed by adjusting conditions for obtaining a tea extraction liquid, and in addition, by mixing of the tea extraction liquids with each other, or by addition of a tea extract, or the like.

The ratio of the concentration of the electron-localized catechins relative to the concentration of saccharides (electron-localized catechins/saccharides) in the present green tea beverage packed in a container is preferably 1.0 to 2.5. When the ratio is within this range, the present green tea beverage packed in a container becomes a beverage that has a balance of astringent taste and sweet taste and has spreading fire odor and further is refreshing even when the beverage is drunk in a cold state.

From such viewpoint, the ratio of the concentration of the electron-localized catechins relative to the concentration of saccharides (electron-localized catechins/saccharides) is particularly preferably 1.2 to 2.3, and further preferably 1.5 to 1.8.

In adjustment of the ratio of the concentration of the electron-localized catechins relative to the concentration of saccharides to the above-described range, the ratio may be adjusted with the extraction conditions. However, although the extraction rate of catechin increases at high temperature, saccharides are likely to be decomposed at high temperature, and thus the extraction time is preferably short. At this time, although the adjustment may be performed by addition of the electron-localized catechin and the saccharides, this has a fear of collapsing the balance of a green tea beverage, so the adjustment is preferably performed by adjusting conditions for obtaining a tea extraction liquid, and in addition, by mixing of the tea extraction liquids with each other, or by addition of a tea extract, or the like.

The concentration of caffeine in the present green tea beverage packed in a container is preferably 90 ppm to 190 ppm.

In adjustment of the concentration of caffeine to the above-described range, the concentration of caffeine may be adjusted with the extraction conditions. At this time, although the adjustment may be performed by addition of caffeine, this has a fear of collapsing the balance of a green tea beverage, so the adjustment is preferably performed by adjusting conditions for obtaining a tea extraction liquid, and in addition, by mixing of the tea extraction liquids with each other, or by addition of a tea extract, or the like.

In addition, in the present green tea beverage packed in a container, the ratio of the concentration of total catechins relative to the concentration of caffeine (total catechins/caffeine) is preferably 1.0 to 4.5.

The ratio of the concentration of total catechins relative to the concentration of caffeine is particularly more preferably 1.3 to 4.0, particularly further preferably 2.0 to 4.0.

In adjustment of the ratio of the concentration of total catechins relative to the concentration of caffeine to the above-described range, the adjustment may be performed by adjusting the amount of tea leaves and extraction temperature. At this time, although the adjustment may be performed by addition of total catechins and caffeine, this has a fear of collapsing the balance of a green tea beverage, so the adjustment is preferably performed by adjusting conditions for obtaining a tea extraction liquid, and in addition, by mixing of the tea extraction liquids with each other, or by addition of a tea extract, or the like.

The concentration of the soluble solid content derived from tea leaves in the present green tea beverage packed in a container, is preferably 0.18% to 0.45%. The soluble solid content derived from tea leaves is a sucrose-converted value of the soluble solid content obtained from extraction of the green tea.

The concentration of the soluble solid content derived from tea leaves in the present green tea beverage packed in a container is particularly more preferably 0.19% to 0.40%, and particularly further preferably 0.20% to 0.25%.

In adjustment of the concentration of the soluble solid content derived from tea leaves to the above-described range, the adjustment may be performed by suitably adjusting the amount of tea leaves and extraction conditions.

The ratio of the concentration of saccharides relative to the concentration of the soluble solid content derived from tea leaves (saccharides/(the soluble solid content derived from tea leaves×100)) in the present green tea beverage packed in a container is preferably 5 to 10. The ratio of the concentration of saccharides relative to the concentration of the soluble solid content derived from tea leaves is particularly more preferably 6 to 9, and particularly further preferably 6 to 8.

In adjustment of the ratio of the concentration of saccharides relative to the concentration of the soluble solid content derived from tea leaves to the above-described range, the concentration of the soluble solid content may be elevated by increasing the amount of tea leaves, and the ratio may be adjusted by drying conditions for the raw tea. At this time, although the adjustment may be performed by addition of the saccharides, this has a fear of collapsing the balance of a green tea beverage, so the adjustment is preferably performed by adjusting conditions for obtaining a tea extraction liquid, and in addition, by mixing of the tea extraction liquids with each other, or by addition of a tea extract, or the like.

The pH of the present green tea beverage packed in a container is preferably 6.0 to 6.5 at 20° C. The pH of the present green tea beverage packed in a container is particularly more preferably 6.0 to 6.4, and particularly further preferably 6.1 to 6.3.

The concentrations of the monosaccharide, the disaccharide, the total catechins, the electron-localized catechins and the caffeine described above can be measured by a calibration curve method or the like using a high performance liquid chromatogram (HPLC) or the like.

(Container)

A container to be filled with the present green tea beverage packed in a container is not particularly limited. For example, a plastic-made bottle (so-called PET bottle), a can of a metal such as steel and aluminum, a bottle, a paper container and the like may be used, and particularly, a transparent container such as a PET bottle and the like may be preferably used as the container.

(Manufacturing Method)

The present green tea beverage packed in a container may be manufactured by, for example, selecting raw materials for tea leaves, and suitably adjusting conditions for a dry (fire) process and extraction for the tea leaves, whereby to adjust the concentration of saccharides which is the sum of the concentration of monosaccharides and the concentration of disaccharides to 100 ppm to 300 ppm, and the ratio of the concentration of disaccharides relative to the concentration of monosaccharides (disaccharide/monosaccharide) to 10 to 28 in the beverage. For example, the present green tea beverage packed in a container can be manufactured by preparing an extraction liquid, which is obtained by subjecting tea leaves to a dry (fire) process at 280° C. to 330° C. and extracting the tea leaves at high temperature for a short time, and a conventional general green tea extraction liquid, i.e., an extraction liquid that is obtained by subjecting tea leaves to a dry (fire) process at 80° C. to 150° C. and extracting the tea leaves at low temperature for a long time; and then blending them in a suitable ratio. However, the invention is not limited to such manufacturing method.

As described above, by performing the dry (fire) process to tea leaves, first, the monosaccharides decrease, and then the disaccharides decrease. Accordingly, by adjusting the conditions for the dry (fire) process, the concentration of saccharides and the value of the disaccharides/monosaccharides may be adjusted.

(Explanation for Terms)

The "green tea beverage" in the present invention means a beverage containing a tea extraction liquid or tea extract that is obtained from tea extraction, as a major component.

In addition, the "green tea beverage packed in a container" means a green tea beverage that is packed in a container, and also means a green tea beverage that may be provided for drinking without dilution.

When "X to Y" (X and Y are any number) is expressed in the present specification, it encompasses the meaning of "X or more and Y or less", and also the meaning of "preferably greater than X" and "preferably less than Y" unless otherwise stated.

EXAMPLES

Hereinafter, Examples of the present invention will be explained. However, the present invention is not limited to these Examples.

The "concentration of monosaccharides" in Examples means a total concentration of glucose and fructose, and the "concentration of disaccharides" means a total concentration of sucrose, cellobiose and maltose.

<Evaluation Test 1>

Extraction Liquids A to D described below were prepared, and using these extraction liquids, green tea beverages of Examples 1 to 3 and Comparative Examples 1 to 6 were prepared, and sensory evaluations therefor were performed.

(Extraction Liquid A)

Tea leaves (Yabukita species, first flush tea produced in Shizuoka Prefecture) after plucking were subjected to Aracha process, and subjected to a dry process (fire process) with a rotation drum type drying machine under the conditions of 90° C. of the setting temperature and 30 minutes of the dry time. The tea leaves were extracted under the conditions of 5 g of the tea leaves, 1 L of 90° C. hot water and 3 minutes of the extraction time. This extraction liquid was filtered with a stainless mesh (20 mesh) to remove the tea grounds, and then further filtered with a stainless mesh (80 mesh). The filtrate was centrifugally isolated with use of SA1 continuous centrifugal isolator (manufactured by Westphalia) under the conditions of 300 L/h of the flow rate, 10000 rpm of the rotation number, and 1000 m$^2$ of the centrifugal sedimentation liquid area ($\Sigma$), to prepare Extraction Liquid A.

(Extraction Liquid B)

Tea leaves (Yabukita species, first flush tea produced in Shizuoka Prefecture) after plucking were subjected to Aracha process, and subjected to a dry process (fire process) with a rotation drum type drying machine under the conditions of 90° C. of the setting temperature and 30 minutes of the dry time. The tea leaves were extracted under the conditions of 12 g of the tea leaves, 1 L of 90° C. hot water and 5 minutes of the extraction time. This extraction liquid was filtered with a stainless mesh (20 mesh) to remove the tea grounds, and then further filtered with a stainless mesh (80 mesh). The filtrate was centrifugally isolated with use of SA1 centrifugal isolator (manufactured by Westphalia) under the conditions of 300 L/h of the flow rate, 10000 rpm of the rotation number, and 1000 m$^2$ of the centrifugal sedimentation liquid area ($\Sigma$), to prepare Extraction Liquid B.

(Extraction Liquid C)

Tea leaves (Yabukita species, first flush tea produced in Shizuoka Prefecture) after plucking were subjected to Aracha process, and subjected to a dry process (fire process) with a rotation drum type drying machine under the conditions of 280° C. of the setting temperature and 10 minutes of the dry time. The tea leaves were extracted under the conditions of 20 g of the tea leaves, 1 L of 90° C. hot water and 5 minutes of the extraction time. This extraction liquid was filtered with a stainless mesh (20 mesh) to remove the tea grounds, and then further filtered with a stainless mesh (80 mesh). The filtrate was centrifugally isolated with use of SA1 centrifugal isolator (manufactured by Westphalia) under the conditions of 300 L/h of the flow rate, 10000 rpm of the rotation number, and 1000 m² of the centrifugal sedimentation liquid area (Σ), to prepare Extraction Liquid C.

(Extraction Liquid D)

Tea leaves (Yabukita species, first flush tea produced in Shizuoka Prefecture) after plucking were subjected to Aracha process, and subjected to a dry process (fire process) with a rotation drum type drying machine under the conditions of 280° C. of the setting temperature, and 10 minutes of the dry time. The tea leaves were extracted under the conditions of 5 g of the tea leaves, 1 L of 90° C. hot water and 3 minutes of the extraction time. This extraction liquid was filtered with a stainless mesh (20 mesh) to remove the tea grounds, and then further filtered with a stainless mesh (80 mesh). The filtrate was centrifugally isolated with use of SA1 continuous centrifugal isolator (manufactured by Westphalia) under the conditions of 300 L/h of the flow rate, 10000 rpm of the rotation number, and 1000 m² of the centrifugal sedimentation liquid area (Σ), to prepare Extraction Liquid D.

(Analysis of Extraction Liquids)

1/10 amount of each extraction liquid described above was weighed, added with ascorbic acid in 400 ppm, and then added with sodium bicarbonate to adjust pH to 6.2, and added with ion-exchanged water to adjust the total amount to 100 ml. This liquid was filled into a heat-resistant transparent container (bottle) and capped, and over-turn sterilized for 30 seconds. The sterilization was performed to 9 or more of $F_0$ value for retort sterilization (121° C., 9 minutes), and the solution was immediately cooled to 20° C. and measured for analysis of the components of each extraction liquid.

The results of the analyses are shown in Table 1 described below. The measurement method is as described below.

TABLE 1

|   | Disaccharide/ Monosaccharide | Concentration of saccharides (ppm) | Electron-localized catechins (ppm) | Soluble solid content derived from tea leaves (%) | Conditions for drying | Extraction time (Min.) | Amount of tea leaves used (g/L) |
|---|---|---|---|---|---|---|---|
| A | 1.81 | 80.3 | 188.9 | 0.11 | 90° C. of firing for 30 min. | 3 | 5 |
| B | 1.92 | 350.4 | 826.8 | 0.42 | 90° C. of firing for 30 min. | 5 | 12 |
| C | 30.00 | 335.2 | 566.2 | 0.53 | 280° C. of firing for 10 min. | 5 | 20 |
| D | 29.08 | 50.3 | 96.3 | 0.10 | 280° C. of firing for 10 min. | 3 | 5 |

(Blending)

Each of the Extraction Liquids A to D was blended in the ratios shown in Table 2 below, added with ascorbic acid in 400 ppm, and then added with sodium bicarbonate to adjust pH to 6.2, and added with ion-exchanged water to adjust the total amount to 1000 ml. This liquid was filled into a heat-resistant transparent container (bottle) and capped, and over-turn sterilized for 30 seconds. The sterilization was performed to 9 or more of $F_0$ value for retort sterilization (121° C., 9 minutes), and the solution was immediately cooled to 20° C., to prepare green tea beverages of Examples 1 to 3 and Comparative Examples 1 to 6.

TABLE 2

|   | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|
| A | 30 | 0 | 20 | 40 | 0 | 5 | 0 | 100 | 0 |
| B | 0 | 30 | 0 | 10 | 75 | 0 | 0 | 0 | 100 |
| C | 70 | 0 | 60 | 0 | 0 | 95 | 20 | 0 | 0 |
| D | 0 | 70 | 20 | 50 | 25 | 0 | 80 | 0 | 0 |
| Total ratio | 100 | 100 | 100 | 100 | 100 | 100 | 100 | 100 | 100 |

TABLE 3

|   | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|
| Concentration Of Saccharides (ppm) | 258.7 | 140.3 | 227.2 | 92.3 | 275.4 | 322.5 | 107.3 | 80.3 | 350.4 |

TABLE 3-continued

| | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|
| Disaccharide/Monosaccharide | 21.54 | 20.93 | 24.18 | 15.46 | 8.71 | 28.59 | 29.26 | 1.81 | 1.92 |
| Electron-Localized Catechins (ppm) | 453.0 | 315.4 | 396.8 | 206.4 | 644.2 | 547.3 | 190.2 | 188.9 | 826.8 |
| Caffeine (ppm) | 178.6 | 91.1 | 159.7 | 60.6 | 159.0 | 226.3 | 83.8 | 45.1 | 196.7 |
| pH | 6.2 | 6.2 | 6.2 | 6.2 | 6.2 | 6.2 | 6.2 | 6.2 | 6.2 |
| Electron-Localized Catechins/Concentration Of Saccharides | 1.75 | 2.25 | 1.75 | 2.24 | 2.34 | 1.70 | 1.77 | 2.35 | 2.36 |
| Total Catechins (ppm) | 514.8 | 358.4 | 450.9 | 234.5 | 732.0 | 622.0 | 216.2 | 209.9 | 918.7 |
| Soluble Solid Content Derived From Tea Leaves Brix (%) | 0.40 | 0.20 | 0.36 | 0.14 | 0.34 | 0.51 | 0.19 | 0.11 | 0.42 |
| Brix (%) | 0.44 | 0.25 | 0.40 | 0.18 | 0.39 | 0.55 | 0.23 | 0.15 | 0.47 |
| Odor Note Through The Nose | ○ | ◎ | ◎ | ○ | Δ | Δ | Δ | X | X |
| Aftertaste (Bitter Taste And Light Taste) | ○ | ◎ | ○ | X: light taste | Δ | X: bitter taste | X: light taste &bitter taste | X: light taste | X: bitter taste |
| Color Tone (Redness. etc.) | ○ | ○ | Δ | ○ | ○ | Δ | X | ○: faint | ○: faint |
| Total Evaluation | ○ | ◎ | ○ | Δ | Δ | Δ | X | X | X |

(Analysis)

The components and pH of the green tea beverages of Examples 1 to 3 and Comparative Examples 1 to 6 were measured as shown below. The results are shown in Table 3 described above.

The concentration of monosaccharides and the concentration of disaccharides were quantity-measured by a calibration curve method with manipulation of a HPLC saccharide analysis equipment (manufactured by Dionex Corporation) under the conditions described below.

Column: "Carbopack PA1 φ4.6×250 mm" manufactured by Dionex Corporation
Column Temperature: 30° C.
Mobile Phase:
Phase A 200 mM NaOH
Phase B 1000 mM Sodium Acetate
Phase C Ultrapure water
Flow Rate: 1.0 mL/min
Injection Amount: 25 μL
Detection: "ED50 gold electrode" manufactured by Dionex Corporation The concentration of electron-localized catechin, the concentration of total catechin and the concentration of caffeine were quantity-measured by a calibration curve method with manipulation of a high performance liquid chromatogram (HPLC) under the conditions described below.

Column: "Xbridge shield RP18 φ3.5×150 mm" manufactured by Waters Corporation
Column Temperature: 40° C.
Mobile Phase:
Phase A Water
Phase B Acetonitrile
Phase C 1% phosphoric acid
Flow Rate: 0.5 mL/min
Injection Amount: 5 μL
Detection: "UV230 nm UV detector" manufactured by Waters Corporation The pH was measured with "F-24", a pH meter manufactured by HORIBA, Ltd. according to an ordinary method.

The concentration of the soluble solid content (Brix) was measured with "DD-7" manufactured by ATAGO CO., LTD.

(Evaluation Item)

Using the green tea beverages of Examples 1 to 3 and Comparative Examples 1 to 6, odor note through the nose, aftertaste (bitter taste and light taste) and the color tone (redness and the like) were evaluated.

(Evaluation Test)

The green tea beverages of Examples 1 to 3 and Comparative Examples 1 to 6 (25° C. temperature) were visually observed first for the liquid color by five persons of trained examiners. Then, each beverage was tasted, and given scores by the standards as described below. The average points of the five persons were evaluated such that "◎" indicates 3.5 or more, "○" indicates 3 or more and less than 3.5, "Δ" indicates 2 or more and less than 3, and "x" indicates 1 or more and less than 2. The results thereof are shown in Table 3 described above.

<Odor Note Through the Nose>
Particularly Good=4
Good=3
Present=2
Not sensed=1

<Aftertaste (Bitter Taste and Light Taste)>
Absent=4
Slightly Present=3
Sensed=2
Strong=1

<Color Tone (Redness and the Like)>
Particularly Good=4
Good=3
Slightly Reddish=2
Reddish=1

(Total Evaluation)

The average points of the above-described three evaluation tests were computed, and evaluated in total such that "⊚" indicates 3.5 or more, "○" indicates 3 or more and less than 3.5, "Δ" indicates 2 or more and less than 3, and "x" indicates 1 or more and less than 2.

For any of Examples 1 to 3, excellent results were obtained, of which the total evaluation was "○" or better.

On the other hand, the results were not preferable, of which the evaluation was "Δ" for Comparative Examples 1 to 3 and "x" for Comparative Examples 4 to 6.

From the results of Comparative Examples 1 and 5, it was found that if the concentration of saccharides decreases, the aftertaste becomes light. From the results of Comparative Examples 3 and 6, it was found that if the concentration of saccharides increases, odor note through the nose is suppressed, and bitter taste comes out and thus the aftertaste becomes worse. In addition, from the results of Comparative Examples 3 and 4, it was found that if the value of the disaccharides/monosaccharides increases, odor note through the nose is suppressed, and the aftertaste is also bad, and further the color tone also becomes worse. From the results of Comparative Examples 2, 5 and 6, if the value of the disaccharides/monosaccharides decreases, odor note through the nose is suppressed, and the aftertaste also becomes worse.

From these results, it is assumed that the ranges of the concentration of saccharides being 100 ppm to 300 ppm, and the ratio of the concentration of disaccharides relative to the concentration of monosaccharides (disaccharide/monosaccharide) being 10 to 28, are ranges that allow the odor note through the nose, the aftertaste and the color tone to become better, and it was discovered that a green tea beverage of which these items are in these ranges, has strong fire odor (savory odor), has no light taste, and yet has refreshing aftertaste.

<Evaluation Test 2>

Extraction Liquids E and F below were prepared, and using these extraction liquids, green tea beverages of Examples 4 to 8 were prepared, and sensory evaluations with age were performed.

(Extraction Liquid E)

Tea leaves (Yabukita species, first flush tea produced in Shizuoka Prefecture) after plucking were subjected to Aracha process, and subjected to a dry process (fire process) with a rotation drum type drying machine under the conditions of 300° C. of the setting temperature and 8 minutes of the dry time. The tea leaves were extracted under the conditions of 8 g of the tea leaves, 1 L of 80° C. hot water and 3 minutes of the extraction time. This extraction liquid was filtered with a stainless mesh (20 mesh) to remove the tea grounds, and then further filtered with a stainless mesh (80 mesh). The filtrate was centrifugally isolated with use of SA1 continuous centrifugal isolator (manufactured by Westphalia) under the conditions of 300 L/h of the flow rate, 10000 rpm of the rotation number, and 1000 m² of the centrifugal sedimentation liquid area (Σ), to prepare Extraction Liquid E.

(Extraction Liquid F)

Tea leaves (Yabukita species, first flush tea produced in Shizuoka Prefecture) after plucking were subjected to Aracha process, and subjected to a dry process (fire process) with a rotation drum type drying machine under the conditions of 330° C. of the setting temperature, and 1 minute of the dry time. The tea leaves were extracted under the conditions of 12 g of the tea leaves, 1 L of 80° C. hot water, and 2.5 minutes of the extraction time. This extraction liquid was filtered with a stainless mesh (20 mesh) to remove the tea grounds, and then further filtered with a stainless mesh (80 mesh). The filtrate was centrifugally isolated with use of SA1 continuous centrifugal isolator (manufactured by Westphalia) under the conditions of 300 L/h of the flow rate, 10000 rpm of the rotation number, and 1000 m² of the centrifugal sedimentation liquid area (Σ), to prepare Extraction Liquid F.

(Analysis of Extraction Liquids)

1/10 amount of each of the extraction liquids E and F was weighed, added with ascorbic acid in 400 ppm, and then added with sodium bicarbonate to adjust pH to 6.2, and added with ion-exchanged water to adjust the total amount to 100 ml. This liquid was filled into a heat-resistant transparent container (bottle) and capped, and over-turn sterilized for 30 seconds. The sterilization was performed to 9 or more of $F_0$ value for retort sterilization (121° C., 9 minutes), and the solution was immediately cooled to 20° C. and measured for analysis of the components of each extraction liquid.

The results of the analyses are shown in Table 4 described below. The measurement method is as described above.

TABLE 4

|   | Concentration of saccharides (ppm) | Disaccharide/ Monosaccharide | Electron-localized catechins (ppm) | Soluble solid content derived from tea leaves (%) | Conditions for drying | Amount of tea leaves used (g/L) | Extraction time (Min.) |
|---|---|---|---|---|---|---|---|
| E | 205.1 | 14.08 | 520.5 | 0.23 | 300° C. of firing for 8 min. | 8 | 3 |
| F | 142.8 | 10.20 | 123.8 | 0.26 | 330° C. of firing for 1 min. | 12 | 2.5 |

(Blending)

Extraction Liquids E and F were blended in the ratios shown in Table 5 below, added with ascorbic acid in 400 ppm, and then added with sodium bicarbonate to adjust pH to 6.2, and added with ion-exchanged water to adjust the total amount to 1000 ml. This liquid was filled into a heat-resistant transparent container (bottle) and capped, and over-turn sterilized for 30 seconds. The sterilization was performed to 9 or more of $F_0$ value for retort sterilization (121° C., 9 minutes), and the solution was immediately cooled to 20° C., to prepare the green tea beverages of Examples 4 to 8. The results of the measurements for the components of the green tea beverages of Examples 4 to 8 are shown in Table 6 described below. The concentration of monosaccharides, the concentration of disaccharides, the concentration of the electron-localized catechins, the concentration of total catechins, the concentration of caffeine and pH were measured in the same manner as described above.

TABLE 5

|   | Example 4 | Example 5 | Example 6 | Example 7 | Example 8 |
|---|---|---|---|---|---|
| E | 60 | 40 | 20 | 0 | 100 |
| F | 40 | 60 | 80 | 100 | 0 |
| Total ratio | 100 | 100 | 100 | 100 | 100 |

TABLE 6

|  |  | Example 4 | Example 5 | Example 6 | Example 7 | Example 8 |
|---|---|---|---|---|---|---|
| Electron-Localized Catechins/Saccharides | | 2.01 | 1.68 | 1.31 | 0.87 | 2.54 |
| Concentration Of Saccharides | | 180.2 | 167.7 | 155.3 | 142.8 | 205.1 |
| Disaccharide/Monosaccharide | | 12.53 | 11.75 | 10.98 | 10.20 | 14.08 |
| Electron-Localized Catechin (ppm) | | 361.8 | 282.5 | 203.1 | 123.8 | 520.5 |
| Caffeine (ppm) | | 142.2 | 132.8 | 123.3 | 113.8 | 161.2 |
| pH | | 6.2 | 6.2 | 6.2 | 6.2 | 6.2 |
| Total Catechin (ppm) | | 411.2 | 321.0 | 230.8 | 140.7 | 591.5 |
| Soluble Solid Content Derived From Tea Leaves Brix (%) | | 0.24 | 0.25 | 0.25 | 0.26 | 0.23 |
| Brix (%) | | 0.28 | 0.29 | 0.29 | 0.30 | 0.27 |
| Change Over Time | Sediments | ± | — | — | — | + |
| | Odor Note Through The Nose | ○ | ○ | ○ | ○ | Δ |
| | Aftertaste (Bitter Taste And Light Taste) | ○ | ⊚ | ○ | Δ | Δ |
| | Deteriorated Smell | ○ | ⊚ | ⊚ | Δ | Δ |
| | Balance Of Flavor | ⊚ | ⊚ | ○ | Δ | Δ |
| | | Appropriately condensed feeling, odor note through the nose and no bitter taste or astringent taste in the aftertaste, and refreshing taste | Good balance of nutritious taste and flavor, odor note through the nose and no bitter taste or astringent taste in the aftertaste, and refreshing taste | Light nutritious taste, appropriate odor note through the nose sensed, and no bitter taste or astringent taste in the aftertaste, and refreshing taste | | |
| Total Evaluation | | ○ | ⊚ | ○ | Δ | Δ |

(Evaluation Item)

The green tea beverages of Examples 4 to 8 were stored at 37° C. for 2 months, and the sediments, the odor note through the nose, the aftertaste (bitter taste and light taste), the deteriorated smell, and the balance of flavor were evaluated.

(Evaluation Test)

The green tea beverages of Examples 4 to 8 (25° C. temperature) were visually observed first for the presence or absence of sediments by five persons of trained examiners. Then, each beverage was tasted, and given scores by the standards as described below. The average points of the five persons were evaluated such that "⊚" indicates 3.5 or more, "○" indicates 3 or more and less than 3.5, "Δ" indicates 2 or more and less than 3, and "x" indicates 1 or more and less than 2. The results thereof are shown in Table 6 described above.

<Sediments>
+: Sediments, which does not disappear with light stirring
±: Slight sediments recognized, which disappears with light stirring
−: No sediments <Odor Note Through the Nose>
Particularly Good=4
Good=3
Present=2
Not sensed=1

<Aftertaste (Bitter Taste and Light Taste)>
Absent=4
Slightly Present=3
Sensed=2
Strong=1

<Deteriorated Smell>
Not sensed=4
Slightly Sensed=3
Sensed=2
Strongly Sensed=1

<Balance of Flavor>
Particularly Good=4
Good=3
Slight collapsed=2
Collapsed=1

(Total Evaluation)

The average points of the 4 evaluation tests of the odor note through the nose, the aftertaste (bitter taste and light taste), the deteriorated smell and the balance of flavor were computed, and evaluated in total such that "⊙" indicates 3.5 or more, "○" indicates 3 or more and less than 3.5, "Δ" indicates 2 or more and less than 3, and "×" indicates 1 or more and less than 2.

For any of Examples 4 to 6, excellent results were obtained, of which the total evaluation was "○" or better.

On the other hand, for Examples 7 and 8, the evaluation was "Δ," which were slightly worse than the results of Examples 4 to 6.

From the results of Example 7, it was found that if the value of the electron-localized catechins/saccharides decreases, the aftertaste (bitter taste and light taste), the deteriorated smell and the balance of flavor become worse. From the results of Example 8, it was found that if the value of the electron-localized catechins/saccharides increase, all the items becomes worse, and further, sediments is also generated.

From these results, it is assumed that the range of the electron-localized catechins/saccharides being 1.0 to 2.5, is a range that allows no generation of sediments even with age, and improvements in the odor through the nose, the aftertaste (bitter taste and light taste), the deteriorated smell and the balance of flavor. It was discovered that a green tea beverage of which these items are in these ranges, has strong fire odor (savory odor), has no light taste, and yet has refreshing aftertaste, and has no generation of sediments even with age.

The invention claimed is:

1. A green tea beverage packed in a container, wherein:
   the green tea beverage includes at least 50% or more by mass of a liquid extraction of green tea,
   a total concentration of glucose, fructose, sucrose, cellobiose, and maltose is 100 ppm to 300 ppm,
   a ratio of (i) a total concentration of sucrose, cellobiose, and maltose, to (ii) a total concentration of glucose and fructose, is 10 to 28, and
   a concentration of catechins is 150 ppm to 600 ppm.

2. The green tea beverage packed in a container according to claim 1, wherein a ratio of (i) a concentration of electron-localized cathecins to (ii) the total concentration of glucose, fructose, sucrose, cellobiose, and maltose, is 1.0 to 2.5.

3. A method of manufacturing a green tea beverage packed in a container, comprising steps of:
   adjusting a total concentration of glucose, fructose, sucrose, cellobiose, and maltose to 100 ppm to 300 ppm;
   adjusting a ratio of (i) a total concentration of sucrose, cellobiose, and maltose, to (ii) a total concentration of glucose and fructose, to 10 to 28; and
   adjusting a concentration of catechins to 150 ppm to 600 ppm,
   wherein the green tea beverage includes at least 50% or more by mass of a liquid extraction of green tea.

4. A method of improving flavor of a green tea beverage packed in a container, comprising steps of:
   adjusting a total concentration of glucose, fructose, sucrose, cellobiose, and maltose to 100 ppm to 300 ppm;
   adjusting a ratio of (i) a total concentration of sucrose, cellobiose, and maltose, to (ii) a total concentration of glucose and fructose, to 10 to 28; and
   adjusting a concentration of catechins to 150 ppm to 600 ppm,
   wherein the green tea beverage includes at least 50% or more by mass of a liquid extraction of green tea.

* * * * *